July 24, 1962 — A. F. WELLS — 3,045,582
PORTABLE OUTDOOR-TYPE BARBECUE DEVICE
Filed Nov. 28, 1960 — 2 Sheets-Sheet 1
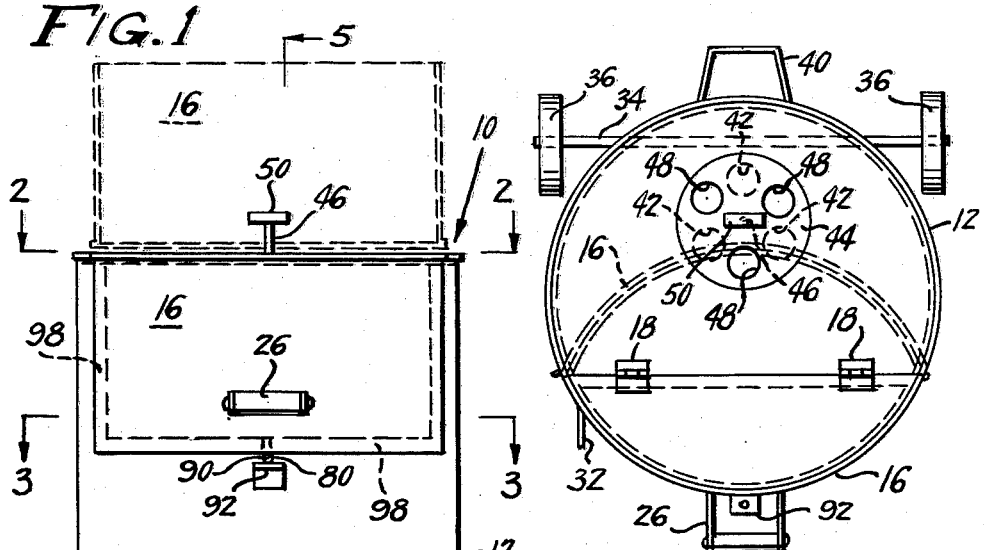
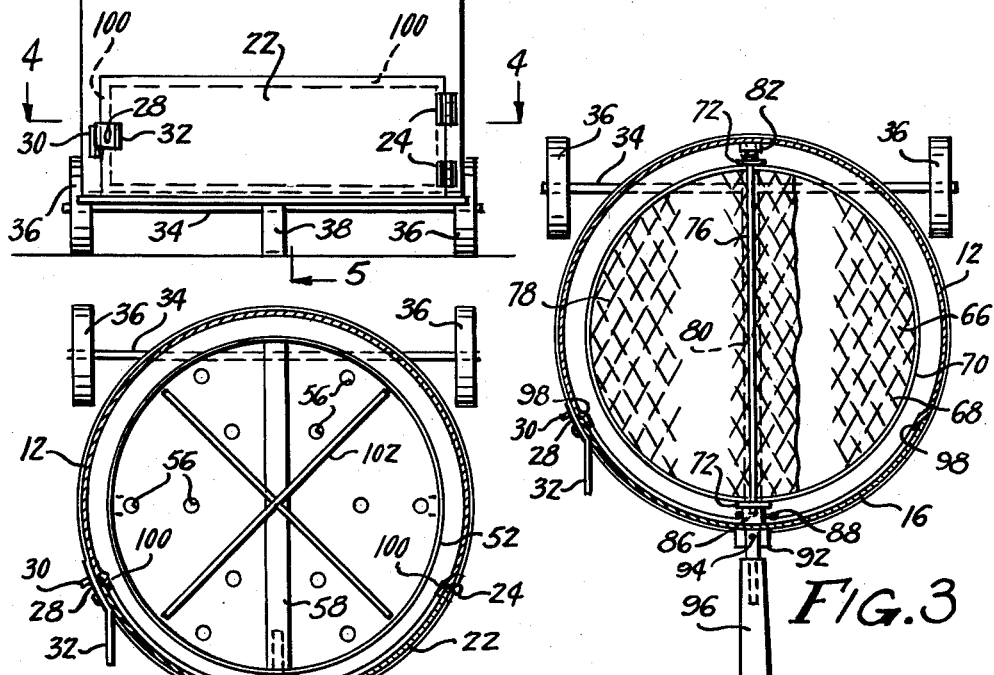
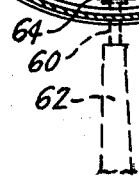
INVENTOR.
ALFRED F. WELLS
BY
Tristan Miller
ATTORNEY.

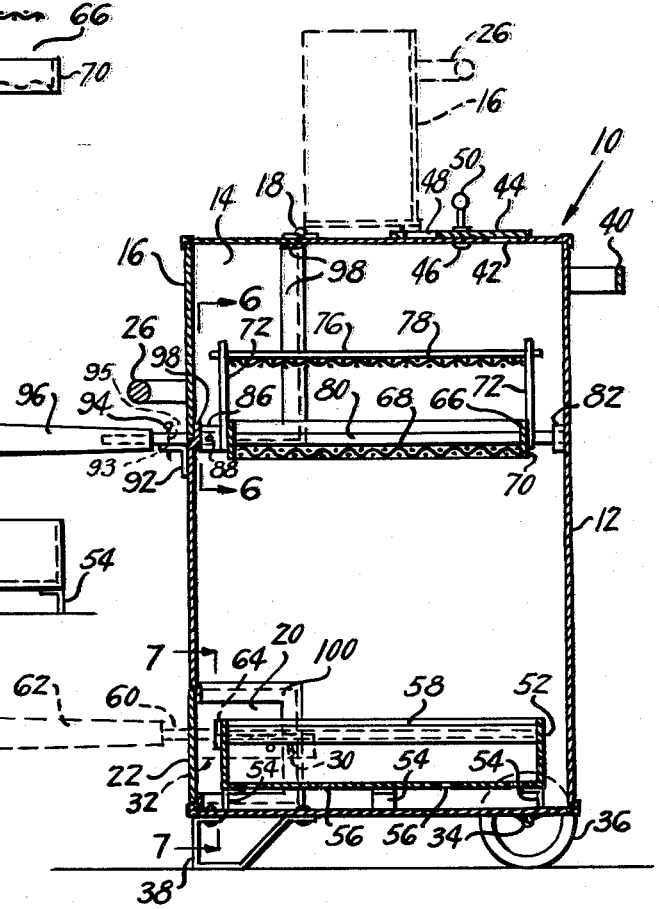
July 24, 1962  A. F. WELLS  3,045,582
PORTABLE OUTDOOR-TYPE BARBECUE DEVICE
Filed Nov. 28, 1960  2 Sheets-Sheet 2
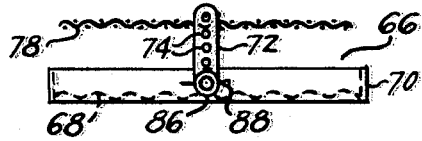
FIG. 6
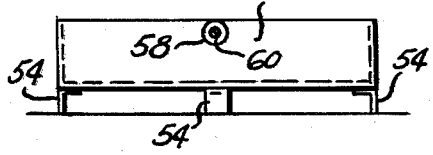
FIG. 7
FIG. 9
FIG. 5
FIG. 8
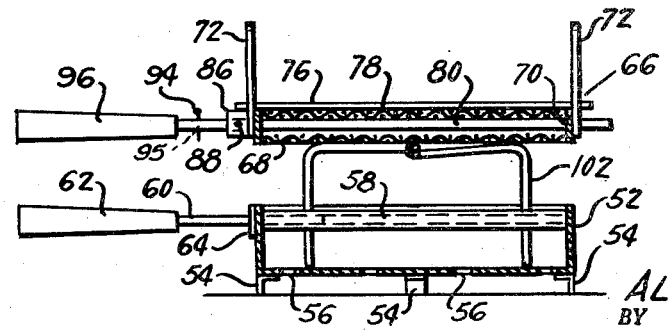
INVENTOR.
ALFRED F. WELLS
BY Tristan Miller
ATTORNEY.

United States Patent Office 3,045,582
Patented July 24, 1962

3,045,582
PORTABLE OUTDOOR-TYPE BARBECUE DEVICE
Alfred F. Wells, P.O. Box 28, Pineville, La.
Filed Nov. 28, 1960, Ser. No. 72,074
3 Claims. (Cl. 99—397)

This invention relates to a portable outdoor barbecue device, and it more particularly relates to a barbecue device of the aforesaid type wherein there is provided a rotatable grid.

Barbecue devices used heretofore have generally included a stationary or built-in firebox with a stationary, although sometimes adjustable grid. If it was desired to cook meats or the like by turning them above the coals, this was accomplished by means of a spit rotatably mounted on the device. However, this spit, although adequate for cooking fowl or a roast or some similar bulk food, was not adequate for cooking steaks, chops, corn, or other such foods which could not be effectively positioned on a spit.

Another disadvantage of prior outdoor barbecue devices was that they generally necessitated the cooking of the foods while open to atmosphere. This not only resulted in a loss of much of the flavor and aroma but also left the food exposed to dirt, dust and insects. In those few cases, however, where the device was constructed to be closed to atmosphere, there was still great difficulty in making the device sufficiently airtight when closed and yet easily openable when desired.

It is one object of the present invention to overcome the above and other disadvantages of the prior art by providing an outdoor-type barbecue device wherein any type of food can be easily and effectively cooked by turning it over the coals, and where such cooking can be effected in either a position which is open to the atmosphere or completely closed from the atmosphere.

Another object of the present invention is to provide an outdoor-type barbecue device, of the aforesaid type, wherein the firebox is removable and can be used either within the device or separately whereby the device is convertible.

Other objects of the present invention are to provide an improved outdoor-type barbecue device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

FIG. 1 is a front elevational view of a barbecue device embodying the present invention, the device being shown in the closed position with the top door being shown in the open position in dash outline.

FIG. 2 is a top plan view taken on line 2—2 of FIG. 1.

FIG. 3 is a cross-sectional view taken on line 3—3 of FIG. 1.

FIG. 4 is a cross-sectional view taken on line 4—4 of FIG. 1.

FIG. 5 is a sectional view taken on line 5—5 of FIG. 1.

FIG. 6 is a fragmentary sectional view taken on line 6—6 of FIG. 5.

FIG. 7 is a fragmentary sectional view taken on line 7—7 of FIG. 5.

FIG. 8 is a sectional view showing the firebox and grid in use outside the housing.

FIG. 9 is an enlarged fragmentary sectional view showing the overlapping relationship between the firebox door of the housing and the adjacent flanged wall of the firebox door opening.

Referring in greater detail to the drawings wherein similar reference characters refer to similar parts, there is shown a barbecue device, generally designated 10, comprising a substantially cylindrical drum or housing 12 having an upper food inserting and removing opening 14, closed by a door 16 hinged to the housing 12 at 18, and a lower firebox opening 20 closed by a door 22 hinged to the housing 12 by hinges 24. The doors 16 and 22 are both curved to correspond to the contour of the cylindrical housing 12, the door 16 being provided with a pull handle 26 at its lower central portion so that it can be swung on its hinges on a horizontal axis and the door 22 being provided with a pivoted latch finger 28 at the side opposite the hinges 24, this latch finger 28 being releasably coactive with a catch 30 on the housing 12 and being integral with a handle 32 whereby the door 22 can be unlatched and swung on a vertical hinge axis.

The housing 12 is mounted on a rear axle 34 and on opposite ends of this axle 34 are provided wheels or rollers 36. At the front of the bottom of the housing 12 is provided a skid bracket 38 whereby the wheels 36 and skid 38 support the housing 12 in stationary position during use but when it is desired to move the housing 12, the front part of the housing 12 is tilted up to make the skid 38 clear the ground and the housing 12 is then moved along on the wheels 36. An open handle 40 is provided adjacent the upper rear end of the housing 12 to provide a means for tilting and moving the housing 12.

On the top of the housing 12, rearwardly of the hinged connection of the door 16, is a flue means comprising an annular series of spaced openings 42 in the housing top wall and a circular rotatable plate 44 mounted on a rivet or the like 46 as a center of rotation. The plate 44 is provided with annularly-spaced openings 48 in the annular plane of the openings 42 so that when the plate 44 is rotated, the openings 48 can be made to either close or partially or fully mate with the openings 42. A handle 50 is mounted on plate 44 to facilitate rotation thereof.

Within the housing 12 is provided a removable circular firebox 52 mounted on feet 54. The firebox 52 is open at the top and closed at the bottom, the bottom wall being perforated at 56 (as best shown in FIG. 4). Across the top of the firebox 52 extends a tubular rod 58 open at each end. This tubular rod 58 is adapted to releasably receive a rod 60 having a heat-insulating handle 62 at one end and a flange 64 intermediate its ends. The flange 64 acts as a stop to limit entrance of the rod 60 into the tubular rod 58.

Intermediate the upper and lower ends of the housing 12 but closer to the upper end is provided a removable grid 66. This grid 66 includes a lower mesh grid plate 68 defined by a peripheral rim 70 of iron, aluminum or the like. Extending up from opposite sides of the rim 70 are two posts 72, only the right hand post 72 (as viewed in FIG. 8) being secured to the rim 70. Each of these posts 72 is provided with a vertical series of spaced holes 74 in alignment with the corresponding holes 74 of the other post 72 to removably receive the ends of a rod 76 connected to an upper mesh grid plate 78. By means of the holes 74, the upper grid plate 78 can be adjusted to various positions relative to the lower grid plate 68.

The lower grid plate 68 is also provided with a transversely extending rod 80 having one end rotatably insertable into a socket or bearing 82 on the inner wall surface of the housing 12. At one side of the plate 68 is provided a collar 86 with a transverse hole to releasably accommodate a locking pin 88 (see FIGS. 3 and 6), the left hand post being fixedly secured on collar 86. When the locking pin 88 is temporarily removed, the collar 86 and the adjacent post 72 may be slid to the left (in FIG.

8) thereby releasing the adjacent end of rod 76 from its related hole 74, and permitting the rod 76 to then be inserted in any selected pair of holes 74 in the two posts 72 to selectively vertically adjust grid plate 78 relative to grid plate 68.

The rod 80 is adapted to extend into the housing 12 through a slot 90 in the housing wall and to rest on a ledge 92 providing a second bearing on the outer surface of the housing wall adjacent the slot 90. The ledge 92 is apertured at 93 to releasably receive a locking pin 94 passing through a hole 95 in the rod 80 which mates with the aperture 93 in the ledge 92 (see FIG. 5). The outer end of the rod 80 is provided with a heat insulating handle 96. The area of firebox 52 is at least equal to the area of the grid plate 68.

In operation, the coals or other heating materials may be ignited either while the firebox 52 is in the housing 12 or while it is outside and then placed in the housing 12, through the opening 20, after which the rod 60 is withdrawn from the tubular rod 58 and the door 22 is closed.

The meat or other food to be cooked is then placed between the upper and lower plates 76 and 68 of the grid 66 with these plates adjusted as desired, and the loaded grid 66 is then placed in the housing 12 through the opening 14 with the inner end of the rod 80 journaled in the bearing 82. The door 16 is then closed and the pin 94 is put in place to lock the rod 80 on the ledge 92. If it is desired to rotate the grid 66, it is merely necessary to release the pin 94 and then rotate the handle 96 as long as desired.

During the cooking operation, except for the openings 42 and 48 in the flue, all leakage of air into the housing 12 and leakage of smoke and aroma out therefrom is substantially prevented by crimped lips or flanges around the door openings of the housing 12. Such flanges are shown at 98 around the bottom and sides of the upper opening 14 (see FIGS. 1 and 5) and at 100 around the top and sides of the lower opening 20 (see FIGS. 1, 5 and 9).

When it is desired to cook the food completely in the open air, this is easily accomplished by inserting the rod 60 into the tubular rod 58, withdrawing the firebox 52 from the housing 12, setting it on the ground or other support and positioning a cross-frame spider 102 consisting of two U-shaped rods placed at angles to each other within the firebox 52 (as in FIG. 8). When not in use, this cross-frame spider 102 may be stored in the housing, as shown in FIG. 4, in the same manner as it is used. The grid 66, with the food properly positioned therein, is then placed on the spider 102 and held there until the food is cooked.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A barbecue device comprising a housing having a food insertion opening adjacent its top and a firebox insertion opening adjacent its bottom, a separate door for each said opening, a removable grid means comprising a pair of grids, and means for securing said grids in adjusted spaced relationship to each other to secure food therebetween, a rod fixedly secured to one said grid for supporting said grid means, bearing means for said rod in said housing at said food insertion opening and on the wall of said housing opposite said food insertion opening, said bearing means at said food insertion opening comprising an exterior ledge on the wall of said housing at said food insertion opening and a slot in said wall leading from said ledge to said food insertion opening, a grid means carrying handle fixed on said rod exteriorly of said housing for rotating said grid means within the housing on said bearing, mating apertures in said ledge and said rod, and a locking pin inserted in said mating apertures in said rod and ledge for holding said grid means locked against rotation.

2. In a barbecue device, a food holding grid means comprising a first grid plate, an upstanding peripheral rim mounted thereon, a transverse rod secured to said first grid plate and extending through said rim, a second grid plate, a transverse rod secured on said second grid plate, and means for securing said second grid plate in adjustably spaced relationship to and on said first grid plate comprising a first upstanding post fixedly secured to said rim adjacent one end of said rod of said first grid plate, a collar slidably mounted on the other end of said first grid plate rod outside of said peripheral rim, a pin inserted in mating holes in said collar and said rod for removably fixing said collar in position, a second upstanding post fixedly secured on said collar, said upstanding posts having pluralities of pairs of aligned transverse apertures for selectively receiving and supporting the ends of said second grid plate transverse rod therethrough.

3. The device of claim 2, and a firebox having a peripheral rim, a perforated bottom plate, legs depending from said bottom plate, a transverse tube secured through said fire box peripheral rim, an insulated handle releasably received within said transverse tube, said housing having a firebox receiving opening adjacent its bottom and a grid receiving opening spaced above said firebox receiving opening, bearing means in said housing removably and rotatably supporting said food holding grid means therein above said firebox, said firebox being supported by its said legs on the housing bottom.

References Cited in the file of this patent
UNITED STATES PATENTS

| | | |
|---|---|---|
| 848,018 | Engelhard | Mar. 26, 1907 |
| 2,297,825 | Bobo | Oct. 6, 1942 |
| 2,349,617 | Gorman | May 23, 1944 |
| 2,502,685 | Warner | Apr. 4, 1950 |
| 2,645,993 | Voss | July 21, 1953 |
| 2,666,426 | Pollard | Jan. 19, 1954 |
| 2,727,505 | Hood | Dec. 20, 1955 |
| 2,846,941 | Goodwin | Aug. 12, 1958 |
| 2,956,497 | Bernstein | Oct. 18, 1960 |
| 2,983,218 | Persinger | May 9, 1961 |